Figure 1:
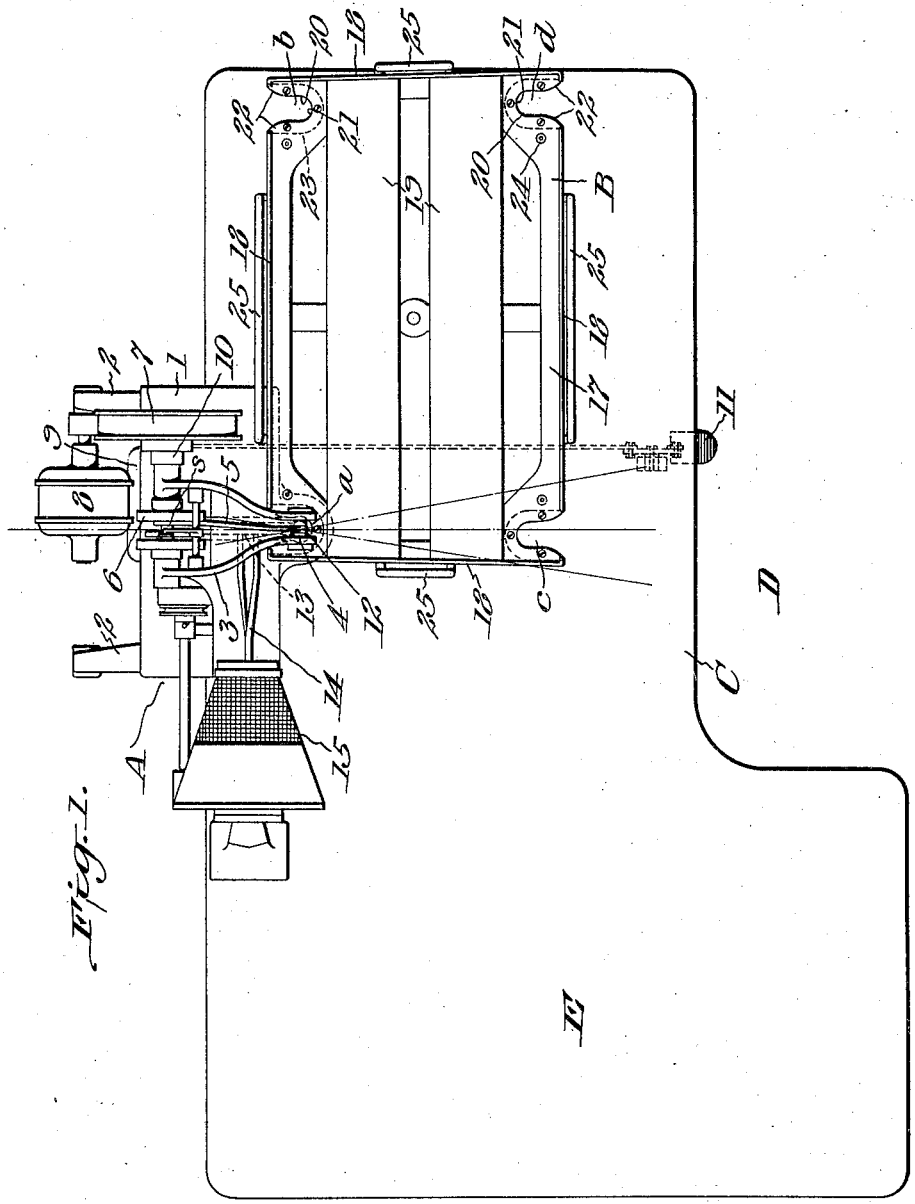

March 8, 1927.

G. A. KING ET AL 1,620,468

MECHANISM FOR SETTING CARPET FASTENERS

Filed April 4, 1925

4 Sheets-Sheet 1

Inventors:
George A. King
Frank E. Warner
Emerson N. Tompkins
by W. N. Linnell
Attorney.

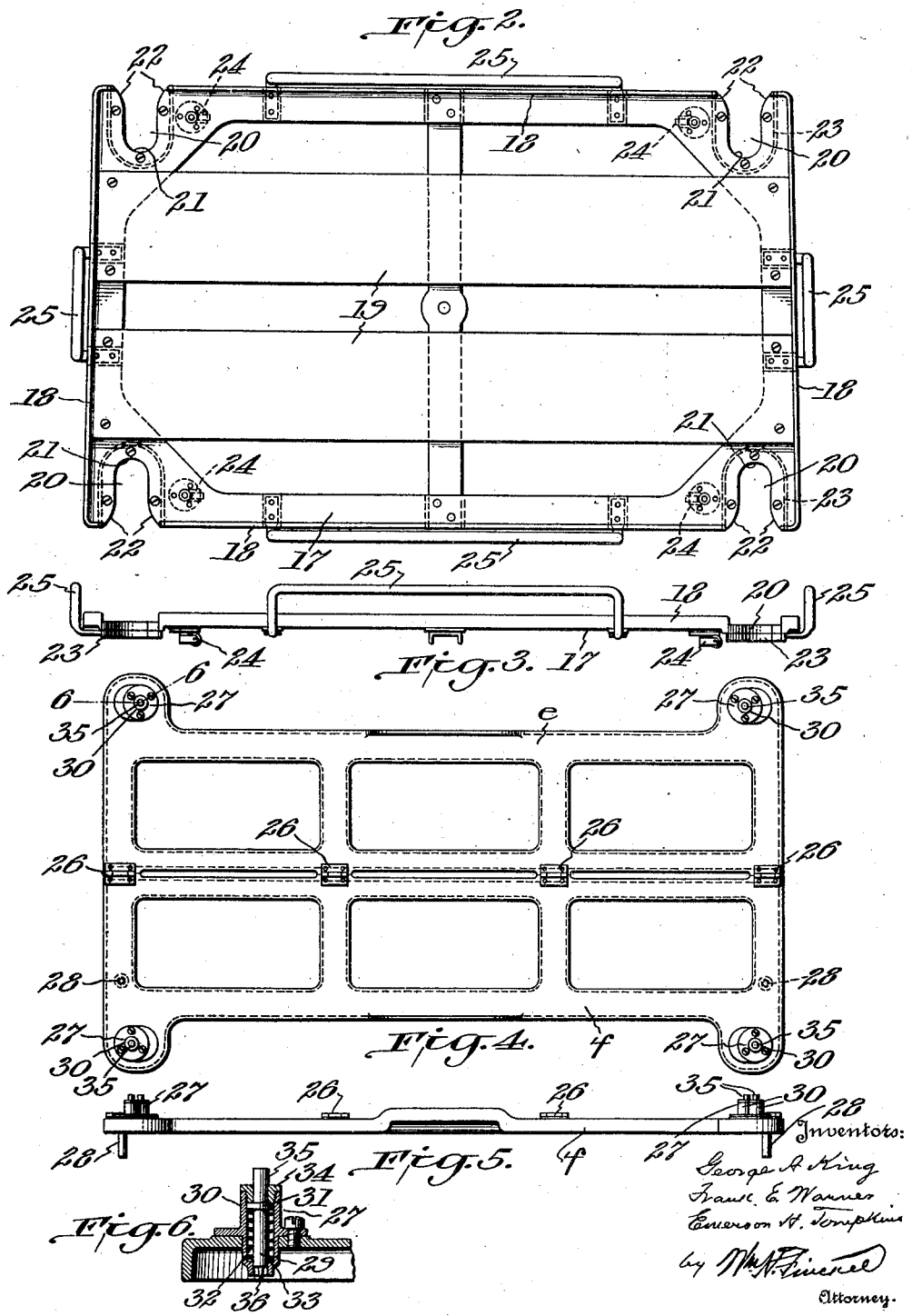

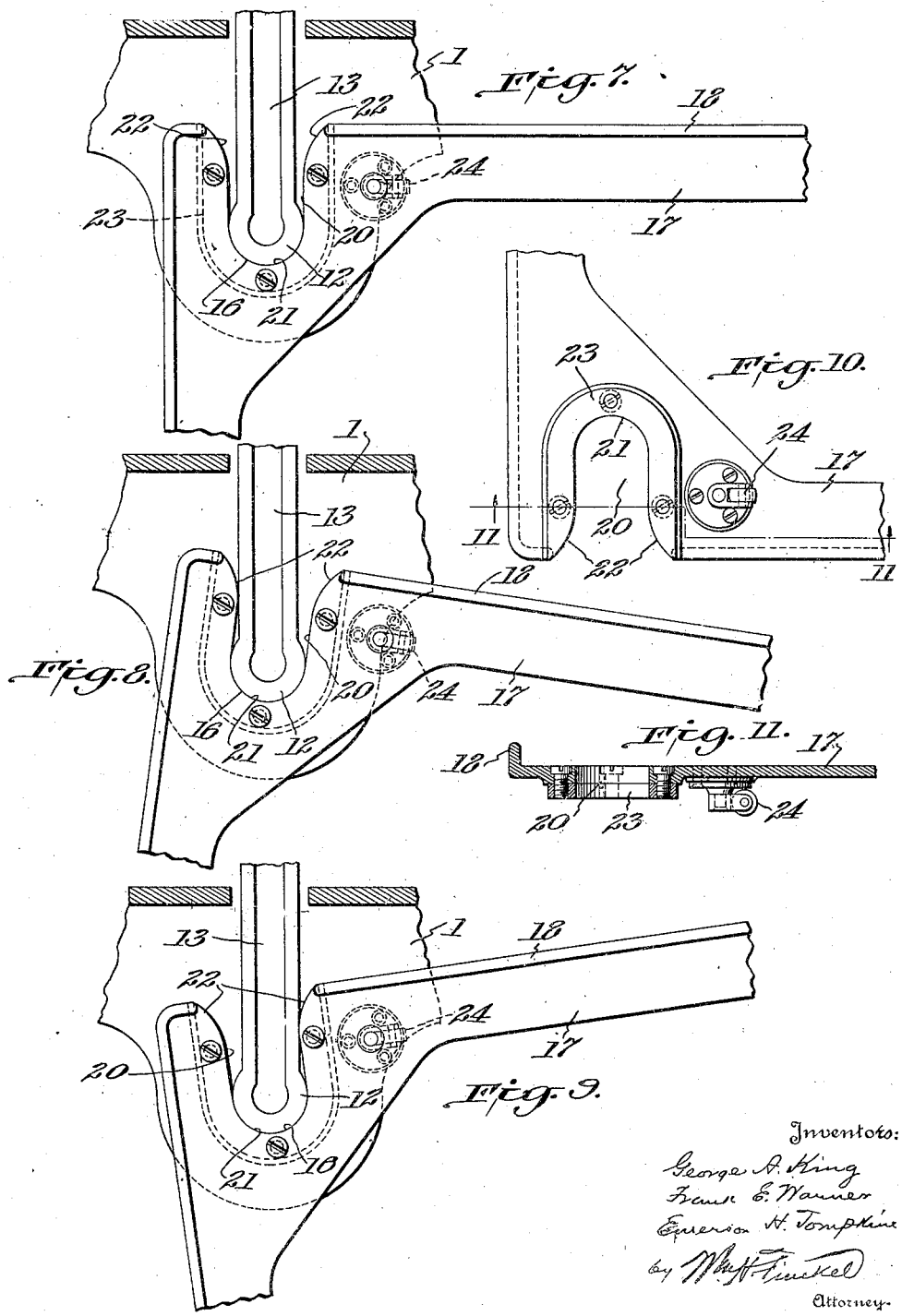

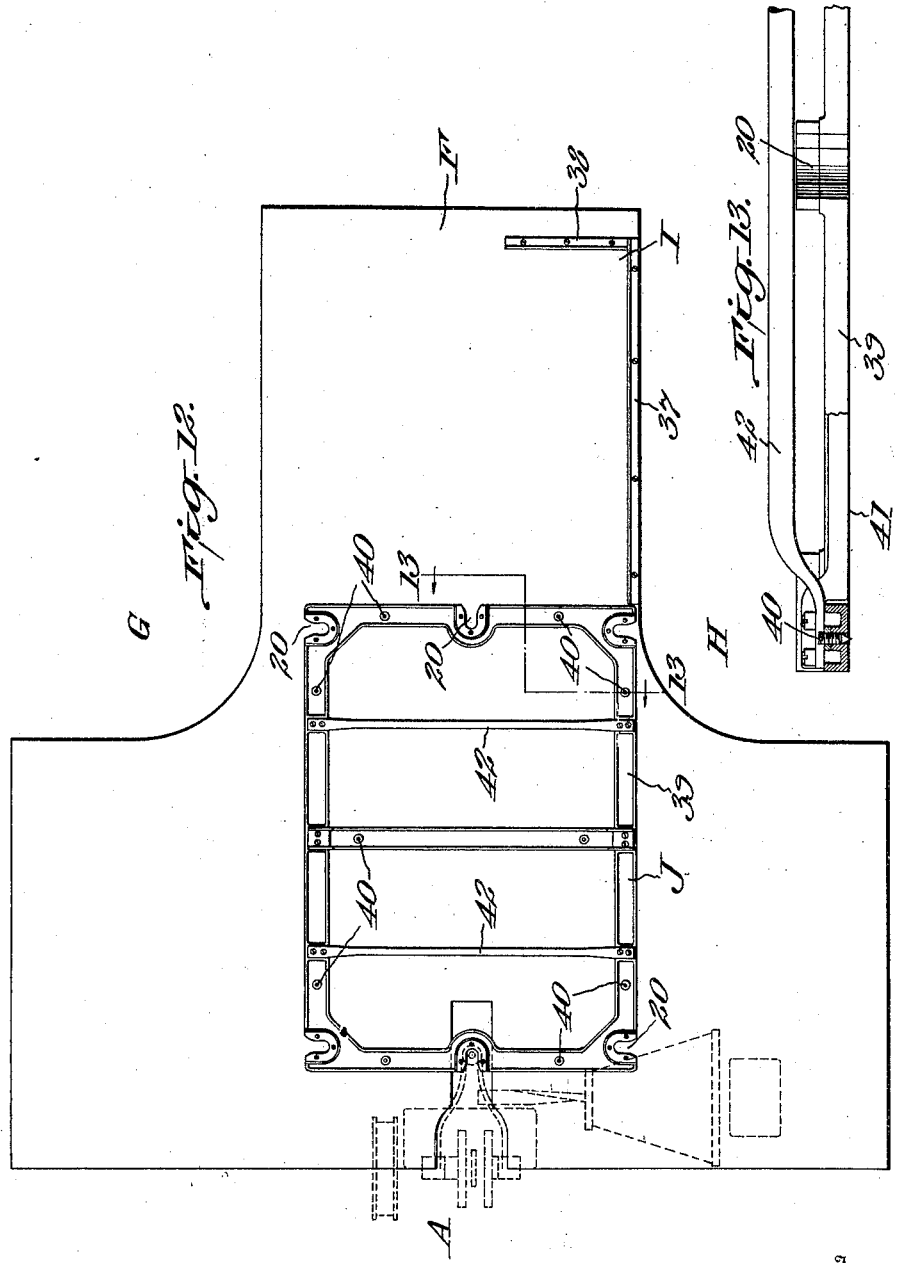

Patented Mar. 8, 1927.

1,620,468

UNITED STATES PATENT OFFICE.

GEORGE A. KING, FRANK E. WARNER, AND EMERSON H. TOMPKINS, OF WATERBURY, CONNECTICUT, ASSIGNORS TO SCOVILL MANUFACTURING COMPANY, OF WATERBURY, CONNECTICUT, A CORPORATION OF CONNECTICUT.

MECHANISM FOR SETTING CARPET FASTENERS.

Application filed April 4, 1925. Serial No. 20,711.

There are certain articles produced in large quantities and provided with snap or other separable fasteners which, in the interest of economy and saving of labor, must be so standardized as to be interchangeable without alteration or fitting. One such article is the carpet or floor covering used in automobiles, and which is provided with a plurality of fastener members so arranged upon the carpet as to cooperate with complemental fastener members fixed in the floor of the automobile. Obviously, if all carpets for a certain type of automobile body are not interchangeable, and if the fastener members of any carpet will not register with the fastener members of any floor, much time and labor will be consumed in fitting of the carpet and in properly arranging the fastener members of carpet and floor so that they will register.

It is, of course, a simple matter to produce large quantities of carpets of identical or substantially identical shape and size, but it is not so easy to so attach the fastener members to each carpet that they will be in identically the same relative positions upon each carpet.

The object of our invention is to provide means for use in attaching fastener members upon automobile or other carpets or rugs, and other similar shaped articles produced in large quantities, in such a manner that the fastener members of any one carpet will be in substantially exactly the same relative positions as the fastener members of any other carpet, thereby attaining the interchangeability of carpets which is so essential.

We contemplate the use, as an adjunct to assist in applying the complemental members of the fasteners of a device for marking in the floors that are to receive the carpets, the locations for such complemental members, so that these complemental members will be in cooperative register with the fastener members carried by any carpet applied thereto.

The invention consists in a mechanism for setting carpet fasteners, including, in combination, a fastener setting machine, a template shaped to receive any one of a plurality of similar carpets or the like, in the same position with respect thereto, cooperating members on the setting machine and template for properly locating the fastener members with respect to the carpets, and a support for the template providing a means whereby it may be manipulated relatively to the setting machine, as we will proceed now to explain and finally claim.

In the accompanying drawings illustrating the invention, in the several figures of which like parts are similarly designated, Figure 1 is a top plan view of the setting machine, template and template support or table in cooperative relation. Fig. 2 is a top plan view, upon a larger scale, of the template. Fig. 3 is a side view of the template. Fig. 4 is a top plan view of the device for locating complemental fastener members. Fig. 5 is a side view of the device of Fig. 4. Fig. 6 is a section, on a larger scale, taken on line 6—6 of Fig. 4. Figs. 7, 8 and 9 illustrate, in fragmentary detail, respectively, the mean and two extreme positions of the template relatively to the setting mechanism of the setting machine, all upon a still larger scale. Fig. 10 is a fragmentary bottom plan view of one corner of the template. Fig. 11 is a section taken on line 11—11 of Fig. 10. Fig. 12 illustrates a modified form of template and table or support therefor. Fig. 13 is a fragmentary section of the modified form of template, taken on line 13—13 of Fig. 12, and on a larger scale.

The mechanism of the invention consists essentially in one aspect, of a fastener setting or attaching machine A, a template B and a template support or table C.

The setting machine A may be of any usual or approved construction, and in the embodiment shown has a bed 1 mounted on suitable legs 2 and carrying a head 3 having a fastener inserting member or setting plunger 4 to which vertical reciprocation is imparted by means of a lever 5 actuated by a cam 6 in response to the rotation of a shaft $s$ on which is loosely mounted a pulley 7 driven by a belt, (not shown), from an electric or other motor 8 mounted upon a stand 9 preferably carried by the legs 2. A clutch 10, of any approved construction, is provided for communicating the rotation of the pulley 7 to the shaft $s$ and cam 6, this clutch being operated by means of a treadle 11 arranged in convenient proximity to the foot of the operator who stands at D.

In axial alignment with the reciprocating plunger 4 is a fastener support or anvil 12 to which fastener members are fed through a raceway 13 and chute 14 from a rotating hopper 15.

As will be seen, particularly by reference to Figs. 7, 8 and 9, the fastener support or anvil 12, for purposes of our invention, has a cylindrical outer end, as indicated at 16, and the raceway 13 is of less width than the diameter of this cylindrical end for a purpose later appearing.

The template shown in Figs. 1, 2, 3, 7, 8, 9, 10 and 11, comprises a frame 17 of a shape to conform to the shape of the carpet or floor covering or rug to which the fastener members are to be applied, and is provided around its outer edge with an upstanding rim 18 by which the carpet or the like is properly positioned and held upon it. The frame 17 is provided with supporting members 19 which will prevent sagging of the carpet or the like carried by it.

Arranged in those locations in the frame 17 of the template at which it is desired to attach the fastener members to the carpet or the like, are recesses 20, one of same being shown located adjacent to each corner of the template. These recesses terminate in substantially semi-circular faces 21 and are flared at their entering edges as at 22. The faces 21 are, as will be readily seen by reference to Figs. 7, 8 and 9, of a curvature corresponding to that of the cylindrical end 16 of the fastener support or anvil 12. The recesses 20 are preferably reinforced, as shown particularly in Figs. 10 and 11, by means of wear members 23 of a relatively hard, wear-resisting metal suitably secured to the frame as by screws, as shown. The need for these wear members will be apparent when it is considered that, in order to obtain lightness, to permit of easy handling, the template is made, preferably, of cast aluminum.

The template is provided with suitable castors 24 upon which it may roll upon the top of the table C. Handles 25 are provided at the sides and ends of the template to facilitate moving it about upon the top of the table, as desired.

The operation of this form of the invention is substantially as follows:—As will be seen by reference to Fig. 1, the table C extends up to and in part embraces the bed 1 of the setting machine, and it will be understood that the upper face of the fastener support or anvil 12 is arranged at such a height above the top of the table C that a carpet resting upon the template B will just pass over it. In other words, the height of the upper or carpet-carrying surface of the template above the table, and the height of the upper surface of the fastener support or anvil 12 above the table are substantially the same.

Now, assuming that a carpet is to be supplied with fastener members, and presupposing that the hopper 15 of the setting machine has been rotated to supply a fastener member to the raceway 13 through the chute 14, and that this fastener member has been advanced into setting position upon the fastener support or anvil 12 by means of any suitable advancing member, such as a pusher actuated in timed relation to the operation of the other parts of the setting machine, the operator will place a carpet upon the template with its edges lying inside of the upstanding rim 18 and will then advance the template with the carpet carried thereby toward the setting machine and in such a manner that one recess $a$ of the recesses 20 will embrace the anvil 12. Owing to the fact, as above pointed out, that the cylindrical end 16 of the anvil and the face 21 of the recess are of complemental curvature, it will be impossible, so long as the template is held against the anvil, for the template to get in such a position that the carpet carried thereby will not be correctly located with respect to the fastener member carried by the anvil and to be set upon the carpet. With the parts in this position, the operator presses upon the treadle 11, thereby starting the setting mechanism of the setting machine in operation and setting or inserting the fastener member in the carpet.

Assuming that the operation just described has taken place with the template in the position shown in Fig. 1, in order to attach the next fastener member with the least exertion on the part of the operator, it is merely necessary for the operator to withdraw the template from the setting machine a distance sufficient for the recess $a$ to clear the anvil 12, and to then move the template bodily upon its castors 24 over the table C to such a position that the recess $b$ may be engaged with the anvil 12, in the same manner as described with reference to the recess $a$. The treadle 11 being again depressed, a fastener member will be inserted or set at this corner of the carpet.

In order to set fasteners upon the other two corners of the carpet it is necessary to turn the template side for side and end for end, so that side of the template containing the recesses $c$ and $d$ may be brought into operative relation to the anvil 12. For this purpose the table C is provided with an enlargement E at one end, this enlarged portion E being of sufficient surface area to permit of rotation of the template upon its castors 24 so that its other side, bearing the recesses $c$ and $d$, may be brought into cooperative relation to the setting machine. The fastener members may then be set upon the carpet by appropriate successive positioning of the recesses $c$ and $d$ with relation to the cylindrical portion 16 of the anvil 12.

Referring now to Figs. 7, 8 and 9, it will be seen that, due to the reduction in width of the raceway 13 relatively to the diameter of the cylindrical portion 16 of the anvil 12, and the flaring edges 22 of the recesses 20, a limited movement of the template is possible when its recesses are in engagement with the cylindrical portion of the anvil 12 without disturbing the axial relationship of the plunger 4 and anvil 12 to the predetermined point upon the carpet, as determined by the recess 20, at which the fastener member must be attached in order to answer the requirement of uniformity in its location upon the carpet, for the reason that, within the limits indicated by the positions shown in Figs. 8 and 9, the cylindrical end 16 of the anvil 12 and the portion 21 of the recess 20 will be in complete operative engagement.

By permitting movement of the template within these limits it will be seen that it is very much easier for the operator to bring template and anvil into cooperative relation than would be the case were it necessary for the operator to bring the template to an exact position relatively to the anvil, and that therefore, much time which would otherwise be wasted in acquiring an exact relative adjustment of these parts, is saved.

The apparatus illustrated in Figs. 4, 5 and 6 is designed for so locating the complemental fastener members (as upon the floor of an automobile body) as to exactly conform to the relative locations of the fastener members attached to the carpets.

This apparatus comprises a jig or frame formed preferably in two parts e and f and hinged together as at 26 to provide for its easy handling. This frame is provided with prick-punch members 27, illustrated in detail in Fig. 6, relatively located exactly as are the centers of the semi-circular faces 21 of the recesses 20.

Inasmuch as we have hereinbefore referred particularly to the utility of our invention in attaching carpet fasteners upon the carpets commonly used in automobiles, it is not amiss here to say that the apparatus illustrated in Figs. 4, 5 and 6 is hinged as described so that it may be folded upon itself and thus easily introduced into the body of an automobile, particularly the tonneau of a touring body, and after introduction thereinto opened and placed upon the floor of the tonneau. Ordinarily such a floor is formed of a plurality of boards, one of which is ordinarily detachably secured to the body frame and is provided adjacent to its ends with holes passing through it and into which the fingers of a mechanic or other person may be introduced for lifting it out, after it is unfastened. These holes provide a ready means for positioning the apparatus just described in proper relation to the floor of the tonneau; and as the holes always occur in the same relative location in bodies of the same type, the same relative position of our apparatus will be assured in any or all of such bodies, where such holes are employed for positioning it. We therefore provide our apparatus with pins 28, which may be inserted in these holes.

The prick-punch members 27 comprise punches 29 mounted in cylinders 30 supported by the frame, and having collars 31 against which abut springs 32 coiled around them and bearing against shoulders 33 formed in the cylinders 30. Upward movement of the punches 29 with respect to the cylinders 30 is limited by nuts 34 against which the collars 31 abut under the influence of the springs 32. The upper ends 35 of the punches project above the upper faces of the nuts 34, and their lower ends are provided with relatively sharp points 36.

With this apparatus properly positioned upon the floor of the body of an automobile or the like, as described, it will be seen that a blow of a hammer or other instrument upon the projecting upper end 35 of each punch, will drive the point 36 of each punch into the floor and thereby make distinct center marks by which the complemental fastener members may be correctly positioned, so that they will be certain to register with the fastener members carried by the carpet.

In the modification shown in Figs. 12 and 13, instead of having the template carry the carpet and providing the template with castors upon which it may be rolled over the table, we dispense with the castors and place the template upon the carpet. We therefore provide a table of somewhat different outline from that shown in Fig. 1 and having an extension F adjacent to which the operator may stand either approximately at the position G or the position H. On this extension F is arranged an angle guide formed of two angle irons or members 37 and 38 secured to the top of the table. Into the angle I of this angle guide one corner of a carpet upon which fastener members are to be set may be projected, the edges of the carpet forming this corner contacting with the angle members 37 and 38, and thereby holding the carpet in position. Then the template J is placed upon the carpet with two of its edges contacting with the angle members 37 and 38, thus properly locating it upon the carpet. The template J is provided with recesses 20 similar, in all respects, to those of the template B first described, and its frame 39 is provided at intervals with pins or gads 40 screwthreaded, as shown in Fig. 13, for adjustment with respect to the under face 41 of the frame. These gads 40 will project into the carpet, and, when the template is moved about over the table by means of the handles 42, will move the carpet along with it, and the carpet will be held in fixed relation to the template by the engagement with it of the gads 40. Sufficient surface area is provided on the table to permit turning of the template and carpet end for end and side for side to permit positioning of the various recesses 20 with respect to the anvil of the setting machine, in the same manner as described in connection with the description of the operation of the form of the invention shown in Figs. 1 to 3.

It will thus be seen that, with our apparatus, it is possible to set fastener members upon a number of similarly shaped carpets or the like with accuracy, as regards their relative positions, whereby any one of such carpets may be substituted for another, and moreover, when the apparatus of Figs. 4, 5 and 6 is used, the complemental fastener members will be so positioned that any carpet of a number of same, upon which the fastener members have been set by our apparatus, may be applied to the complemental fastener members and cooperate with them with accuracy.

Thus, obviously, particularly where the carpets are for use in automobile bodies, any one of a large number of carpets may be used in any one of a large number of bodies, without any fitting or other time and labor consuming operations.

The method herein disclosed of accurately positioning the complemental cooperating members of article fasteners upon a movable article and a fixed part respectively, forms the subject of our application filed as a division hereof on August 12, 1926, Serial No. 128,904.

Various changes are contemplated as within the spirit of the invention and the scope of the following claims.

What we claim is:—

1. Mechanism for setting carpet and the like fasteners, including a setting machine having a fastener inserting member, an anvil cooperating therewith in the inserting operation, a template for cooperation with an article upon which the fasteners are to be set, and cooperating means on the template and anvil, respectively, for properly positioning said template with respect to said anvil.

2. Mechanism for setting carpet and the like fasteners, including a setting machine having a fastener inserting member, an anvil cooperating therewith in the inserting operation, and a template for cooperation with an article upon which said fasteners are to be set, said template having a recess for cooperation with said anvil whereby said template is properly positioned with respect to said anvil.

3. Mechanism for setting carpet and the like fasteners, including a setting machine having a fastener inserting member, an anvil cooperating with said member in the inserting operation and provided with a surface of predetermined conformation, and a template for cooperation with an article upon which fasteners are to be set and having a recess formed for cooperation with the said surface of the anvil, whereby when said recess is in engagement with said anvil said article will be properly positioned relatively to the setting mechanism.

4. In mechanism for setting carpet and the like fasteners, a fastener setting machine having a setting mechanism including a fastener inserting member and an anvil cooperating therewith in the inserting operation, and a template for cooperation with any one of a number of similar articles upon which fasteners are to be set and having a plurality of recesses located in predetermined relative arrangement, said recesses adapted to cooperate with said anvil successively to properly position said article with respect to the setting mechanism, whereby fasteners may be set in the same relative arrangement upon a plurality of similar articles.

5. In mechanism for setting carpet and the like fasteners, a setting machine including a fastener inserting member and an anvil cooperating therewith in the setting operation, a template for cooperation with an article upon which fasteners are to be set, a support for said template for supporting same in predetermined relation to said anvil, and cooperating means on said template and anvil, respectively, which upon cooperative engagement will properly position said article with relation to said setting mechanism.

6. In mechanism for setting carpet and the like fasteners, a setting machine having a fastener setting mechanism including a fastener inserting member and an anvil cooperating therewith in the inserting operation, a template for cooperation with an article upon which fasteners are to be set, a table for supporting said template and upon which same may be moved relatively to said setting machine, and cooperating means on said anvil and template, respectively, which upon cooperative engagement will properly position said article relatively to said setting mechanism.

7. Mechanism for setting carpet and the like fasteners, including a setting machine having a fastener setting mechanism provided with an anvil, a fastener supporting surface on said anvil, a table arranged at a predetermined distance below the fastener supporting surface of the anvil, a template adapted to carry an article upon which fasteners are to be set, said template having means for supporting it at a height above said table substantially coincident with the fastener supporting surface of said anvil, and cooperating means on said anvil and template whereby said article may be positioned in predetermined relation to said setting mechanism.

8. In mechanism for setting carpet and the like fasteners, a setting machine having a fastener setting mechanism including a fastener inserting member and an anvil cooperating therewith in the inserting operation, a table, a template of a form to cooperate with and maintain in predetermined relation to it an article upon which fasteners are to be set and by which said article may be moved about upon said table relatively to said setting machine, and means on said machine and template comprising a substantially cylindrical surface on said anvil and cooperatively shaped recesses formed in said template which upon engagement will properly position said article relatively to said setting mechanism.

In testimony whereof we have hereunto set our hands this 2 day of April, A. D. 1925.

GEORGE A. KING.
FRANK E. WARNER.
EMERSON H. TOMPKINS.